(12) United States Patent
Almalki

(10) Patent No.: US 8,717,309 B2
(45) Date of Patent: May 6, 2014

(54) PORTABLE ELECTRONIC DEVICE INCLUDING A TOUCH-SENSITIVE DISPLAY AND METHOD OF CONTROLLING SAME

(75) Inventor: Nazih Almalki, Waterloo (CA)

(73) Assignee: Blackberry Limited, Waterloo (CA)

( * ) Notice: Subject to any disclaimer, the term of this patent is extended or adjusted under 35 U.S.C. 154(b) by 421 days.

(21) Appl. No.: 12/578,042

(22) Filed: Oct. 13, 2009

(65) Prior Publication Data

US 2011/0084912 A1   Apr. 14, 2011

(51) Int. Cl.
*G06F 3/041* (2006.01)
(52) U.S. Cl.
USPC ............... 345/173; 178/18.01; 178/19.01
(58) Field of Classification Search
USPC .............. 178/18.01–19.07; 345/173–178
See application file for complete search history.

(56) References Cited

U.S. PATENT DOCUMENTS

| 2001/0035854 | A1 | 11/2001 | Rosenberg et al. |
| 2002/0196238 | A1 | 12/2002 | Tsukada et al. |
| 2003/0208324 | A1 | 11/2003 | Bellwood et al. |
| 2006/0119586 | A1 | 6/2006 | Grant et al. |
| 2008/0024459 | A1* | 1/2008 | Poupyrev et al. ............ 345/173 |

FOREIGN PATENT DOCUMENTS

| EP | 1450247 A | 8/2004 |
| EP | 1574934 A | 9/2005 |
| GB | 2402105 A | 12/2004 |

OTHER PUBLICATIONS

European Search Report issued Mar. 23, 2010, in respect of corresponding European Patent Application No. 09172903.8.
Examiner's Report dated Feb. 5, 2013, issued in respect of corresponding Canadian Patent Application No. 2,711,987.

* cited by examiner

*Primary Examiner* — Michael Pervan
(74) *Attorney, Agent, or Firm* — Geoffrey deKleine; Borden Ladner Gervais LLP

(57) ABSTRACT

A method includes detecting a touch on a first touch-sensitive display, applying force by an actuator on a touch-sensitive display to simulate depression of a switch, and storing a first indicator of depression simulation for the first touch.

19 Claims, 5 Drawing Sheets

PORTABLE ELECTRONIC DEVICE INCLUDING A TOUCH-SENSITIVE DISPLAY AND METHOD OF CONTROLLING SAME

FIELD OF TECHNOLOGY

The present disclosure relates to electronic devices, including but not limited to portable electronic devices including touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed.

Improvements in devices with touch-sensitive displays are desirable.

DETAILED DESCRIPTION

Figure 1:
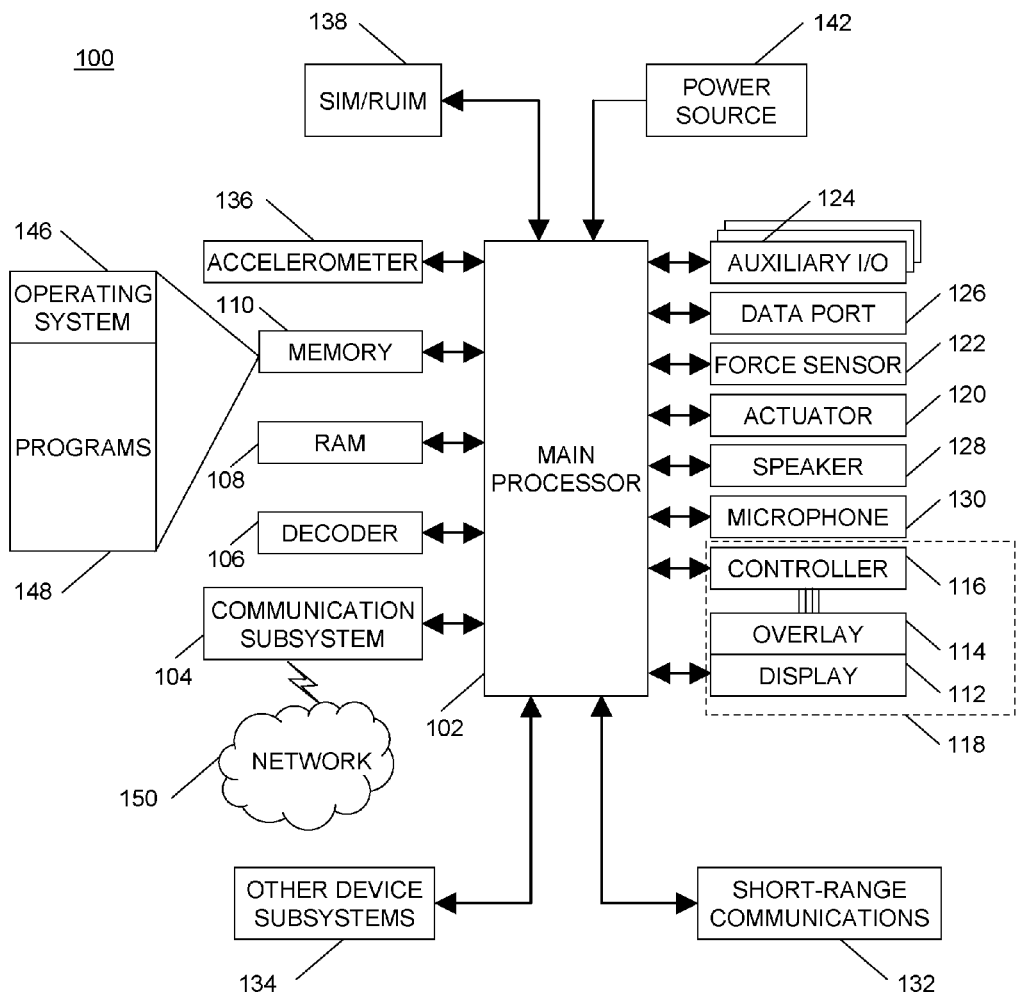
FIG. 1 is a block diagram of a portable electronic device in accordance with the present disclosure.

The following describes an electronic device and method of controlling the electronic device. The method includes detecting a touch on a first touch-sensitive display, applying force by an actuator on a touch-sensitive display to simulate depression of a switch, and storing a first indicator of depression simulation for the first touch.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118 and processed by the controller 116, for example, to determine a location of a touch. Touch location data may include a single point of contact, such as a point at or near a center of the area of contact, or the entire area of contact for further processing. The location of a touch detected on the touch-sensitive display 118 may include x and y components, e.g., horizontal and vertical with respect to one's view of the touch-sensitive display 118, respectively. For example, the x component may be determined by a signal generated from one touch sensor layer, and the y component may be determined by a signal generated from another touch sensor layer. A signal is provided to the controller 116 in response to detection of a suitable object, such as a finger, thumb, or other items, for example, a stylus, pen, or other pointer, depending on the nature of the touch-sensitive display 118. More than one simultaneous location of contact may occur and be detected.

Figure 2A:
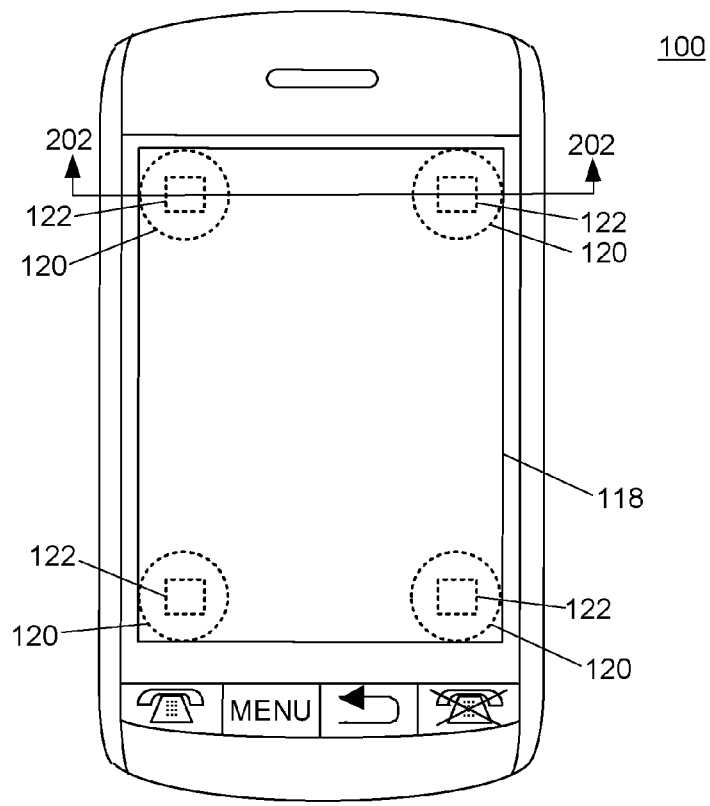
FIG. 2A is a front view of an example of a portable electronic device in accordance with the present disclosure.
Figure 2B:
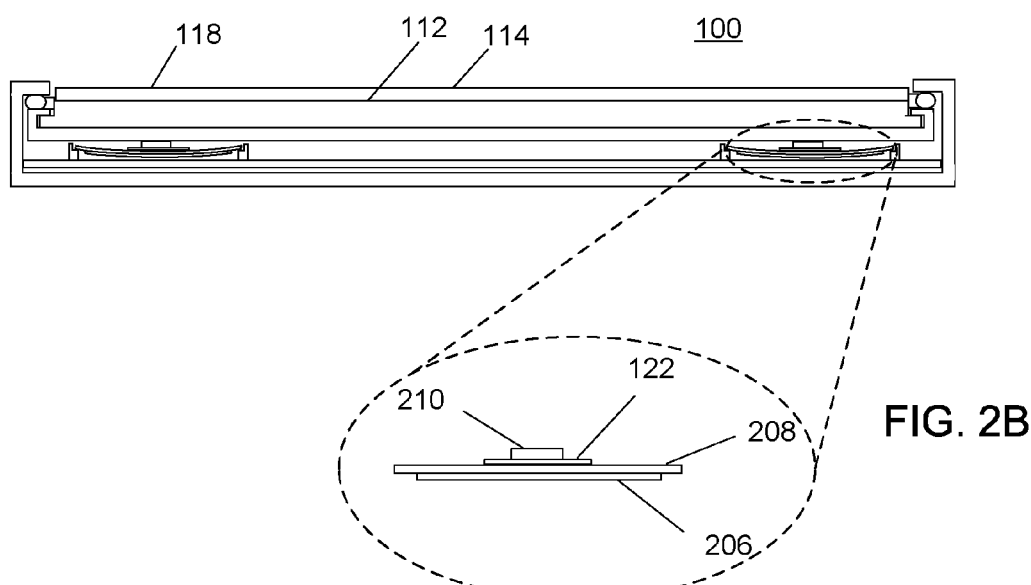
FIG. 2B is a sectional side view of the portable electronic device through the line 202 of FIG. 2, in accordance with the present disclosure.

The actuator 120 may comprise one or more piezoelectric (piezo) actuators that provide tactile feedback. FIG. 2A is front view of an example of a portable electronic device 100. In the example shown in FIG. 2A, the actuator 120 comprises four piezo actuators 120, each located near a respective corner of the touch-sensitive display 118. FIG. 2B is a sectional side view of the portable electronic device 100 through the line 202 of FIG. 2A. Each piezo actuator 120 is supported within the portable electronic device 100 such that contraction of the piezo actuators 120 applies a force against the touch-sensitive display 118, opposing a force externally applied to the display 118. Each piezo actuator 120 includes a piezoelectric device, such as a piezoelectric ceramic disk 206, referred to herein as the piezoelectric disk 206, adhered to a metal substrate 208. An element 210 that is advantageously at least partially flexible and comprises, for example, hard rubber may be located between the disk 206 and the touch-sensitive display 118. The element 210 does not substantially dampen the force applied to or on the touch-sensitive display 118. In the present example, four force sensors 122 are utilized, with each force sensor 122 located between an element 210 and the metal substrate 208. The metal substrate 208 bends when the piezoelectric disk 206 contracts diametrically due to build up of charge at the piezoelectric disk 206 or in response to an external force applied to the touch-sensitive display 118. The charge may be adjusted by varying the applied voltage or current, thereby controlling the force applied by the piezo actuators 120 on the touch-sensitive display 118. The charge on the piezo actuators 120 may be removed by a controlled discharge current that causes the piezoelectric disk 206 to expand diametrically, decreasing the force applied by the piezo actuators 120 on the touch-sensitive display 118. Absent an external force applied to the overlay 114 and absent a charge on the piezoelectric disk 206, the piezo actuator 120 may be slightly bent due to a mechanical preload.

Figure 3:
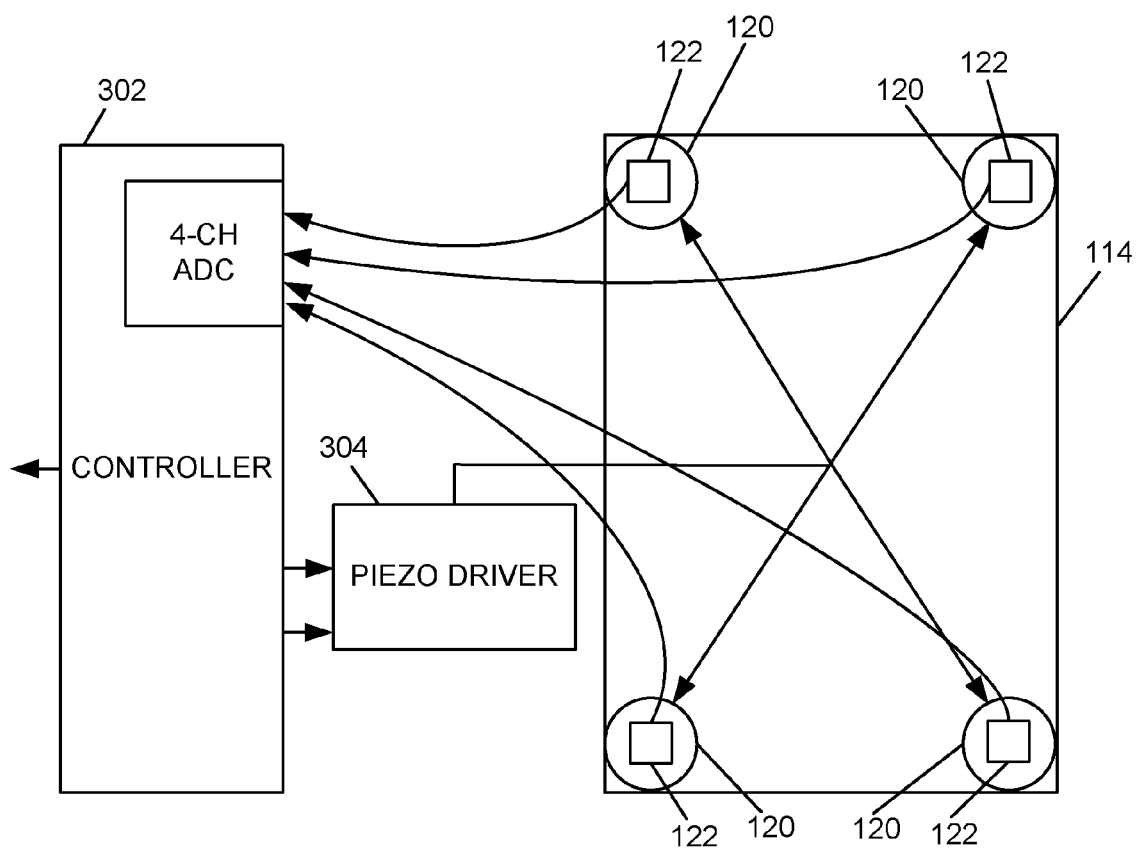
FIG. 3 is a functional block diagram illustrating components of the portable electronic device in accordance with the present disclosure.

FIG. 3 shows a functional block diagram of components of the portable electronic device 100. In this example, each force sensor 122 is connected to a controller 302, which includes an amplifier and analog-to-digital converter (ADC). The force sensors 122 may be, for example, force-sensing resistors in an electrical circuit and therefore the resistance changes with force applied to the force sensors 122. As applied force on the touch-sensitive display 118 increases, the resistance decreases. This change is determined via the controller 116 for each of the force sensors 122, and with calibrated force sensors 122, for example, with known gain and offset values, the corresponding value of the force at each of the force sensors 122 is determined.

The piezo actuators 120 are connected to a piezo driver 304 that communicates with the controller 302. The controller 302 is also in communication with the main processor 102 of the portable electronic device 10 and may receive and provide signals to the main processor 102. The piezo driver 304 may optionally be embodied in drive circuitry between the controller 302 and the piezoelectric disks 312. The controller 302 controls the piezo driver 304 that controls the current to the piezoelectric disks 206 and thus controls the charge and the force applied by the piezo actuators 120 on the touch-sensitive display 118. Each of the piezoelectric disks 206 may be controlled substantially equally and concurrently. Optionally, the piezoelectric disks 206 may be controlled separately. In the example described below, collapse, or depression, and release of a dome switch is simulated. Other switches, actuators, keys, and so forth may be simulated, or a non-simulated tactile feedback may be provided. The charge at the piezo actuators 120 may be modulated to impart a force on the touch-sensitive display to simulate collapse of a dome switch. The charge at the piezo actuators 120 may also be modulated to impart a force, by the piezo actuators 120, to simulate release of a dome switch.

Figure 4:
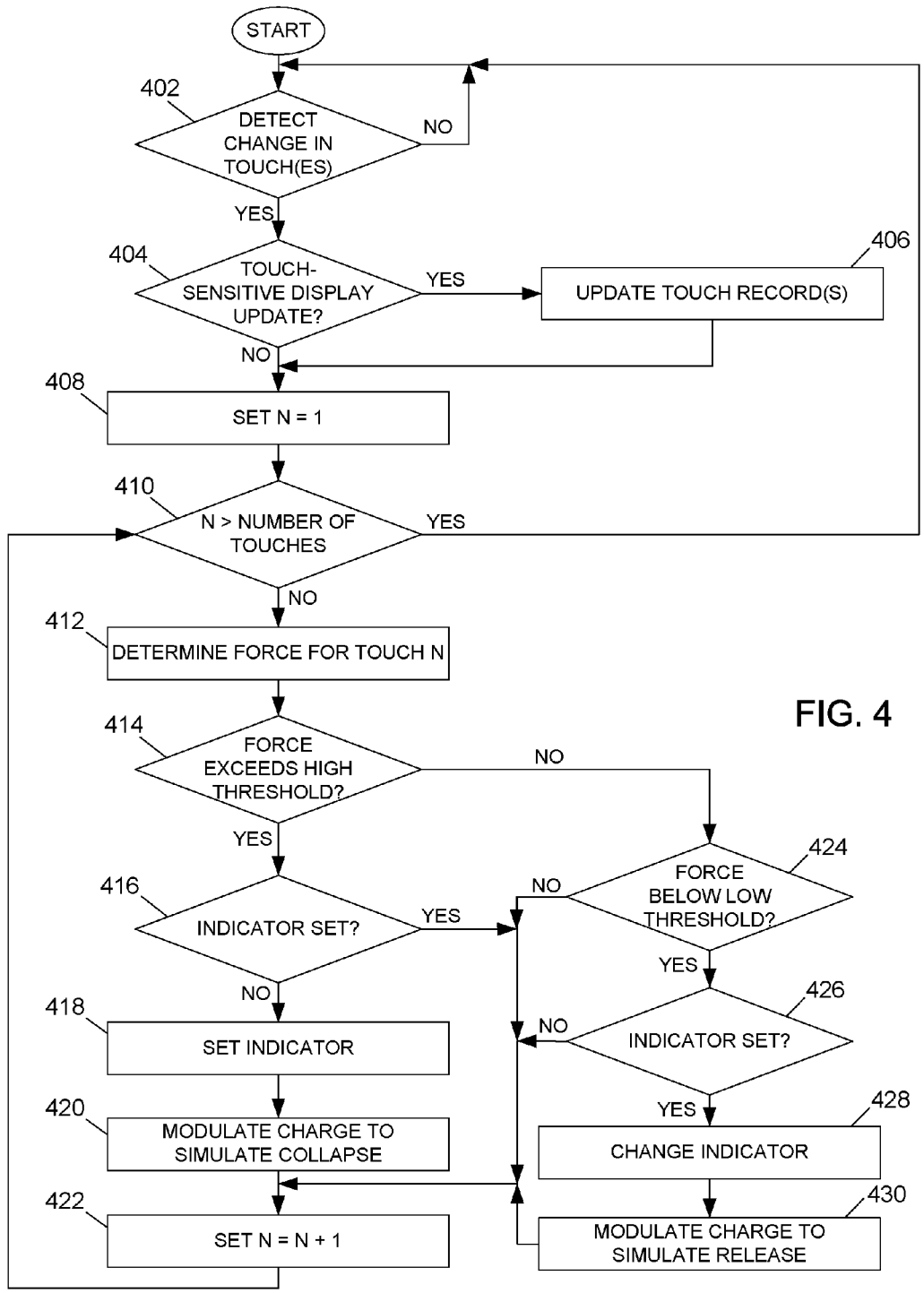
FIG. 4 is flowchart illustrating a method of controlling an electronic device to provide tactile feedback in accordance with the present disclosure.

A flowchart illustrating a method of controlling an electronic device is shown in FIG. 4. The method is advantageously performed by the processor 102 and the controller 116 performing stored instructions from a computer-readable medium. Coding of software for carrying out such a method is within the scope of a person of ordinary skill in the art given the present description.

When a change is detected 402 on the touch-sensitive display, the process proceeds to 404. The change may be a change in force on the touch-sensitive display 118, detected at the force sensors 122, or a change in the number of touches or touch location of a touch or touches, detected at the touch-sensitive display 118, or a change detected by the force sensors 122 and the touch-sensitive display 118.

The number of touches on the touch-sensitive display 118 is tracked and for each touch received at the portable electronic device, a touch record is temporarily stored in memory, for example, in RAM 108, at the portable electronic device 100. The touch record includes the location of the touch, a number assigned to the touch, which may change with a change in the total number of touches, as well as an indicator to indicate when collapse of a dome switch has been simulated for the touch and a corresponding release of the dome switch has not been simulated. The indicator may be, for example, a Boolean flag that is set to true for a touch for which collapse of a dome switch has been simulated and a corresponding release of the dome switch has not been simulated. The indicator may be set to false for a touch for which collapse of a dome switch has not been simulated or for a touch for which the corresponding release of the dome switch has been simulated.

When there is no change in touch location or number of touches on the touch-sensitive display 118 at 404, the process continues at 408. When there is a change in touch location or number of touches, as detected by the touch-sensitive display 118, at 404, the number of touches and the touch records are updated 406. When an additional touch is detected, the number of touches on the touch-sensitive display is increased and a new touch record is created. When a touch ends, the number of touches on the touch-sensitive display is decreased and the corresponding touch record is deleted. The number assigned to each of the remaining touches may be updated. When a touch location changes, the corresponding touch record is changed to update the location.

A variable, referred to as N in the present disclosure, is set 408 to 1. The variable N is compared 410 to the number of touches and when N is greater than the number of touches at 410, the process continues at 402. When N is not greater than the number of touches at 410, the force applied by the touch N is determined 412 utilizing the force sensors 122 such that when N is equal to 1, the force applied by the touch assigned the number 1 is determined 412. A determination is made 414 whether or not the force applied by the touch is greater than a first threshold. When the force applied by the touch is at or below the first threshold, the process continues at 422. When a determination is made 414 that the force applied by the touch is above the first threshold, a determination is made 416 whether or not the corresponding indicator is set to indicate that collapse of a dome switch has been simulated and release of the dome switch has not been simulated for the touch. When the corresponding indicator is set to indicate that collapse of the dome switch has been simulated, the process continues at 422.

When the corresponding indicator is not set to indicate that collapse of a dome switch has been simulated and release of the dome switch has not been simulated for the touch, the indicator is set 418. The charge at the piezo actuators 120 is modulated 420 to modulate the force applied by the piezo actuators 120 on the touch-sensitive display 118 and simulate collapse of the dome switch. The variable N is incremented 422 by 1 and the process continues at 410.

A determination is made 424 whether or not the force applied by the touch is less than a second threshold. The second threshold is lower than the first threshold to determine when the force of the touch is reduced. When the force is not below the second threshold, the process continues at 422. When the force is below the second threshold, a determination is made 426 whether or not the indicator is set to indicate that collapse of a dome switch has been simulated and release of the dome switch has not been simulated for the touch. When the indicator has not been set, the process continues at 422. When the indicator has been set, the indicator is changed 428, for example, by setting the Boolean flag to false. The charge at the piezo actuators 120 is modulated 430 to simulate release of the dome switch for the touch. The process continues at 422.

The process of determining 412 the force for the touch to incrementing 422 the variable N is repeated for each touch on the touch-sensitive display 118. For each touch for which the indicator is not set, the indicator is set 418 and the charge at the piezo actuators 120 is modulated 420 when the force of that touch exceeds the first threshold, providing tactile feedback by simulating collapse of the dome switch. For each touch for which the indicator is set, the indicator is changed 428 and the charge at the piezo actuators 120 modulated 430 to modulate the force applied by the piezo actuators 120 on the touch-sensitive display 118 and simulate release of the dome switch when the force of that touch no longer exceeds the second threshold, providing tactile feedback by simulating collapse and release of a dome switch.

The method of FIG. 4 may be carried out for one or more touches and the charge modulated 420 at the piezo actuators 120 to simulate collapse of the dome switch and modulated 430 to simulate release of the dome switch for each touch. When more than one touch is received, the force applied by each touch is determined at 412. Each force applied may be determined utilizing any suitable method.

Figure 5:
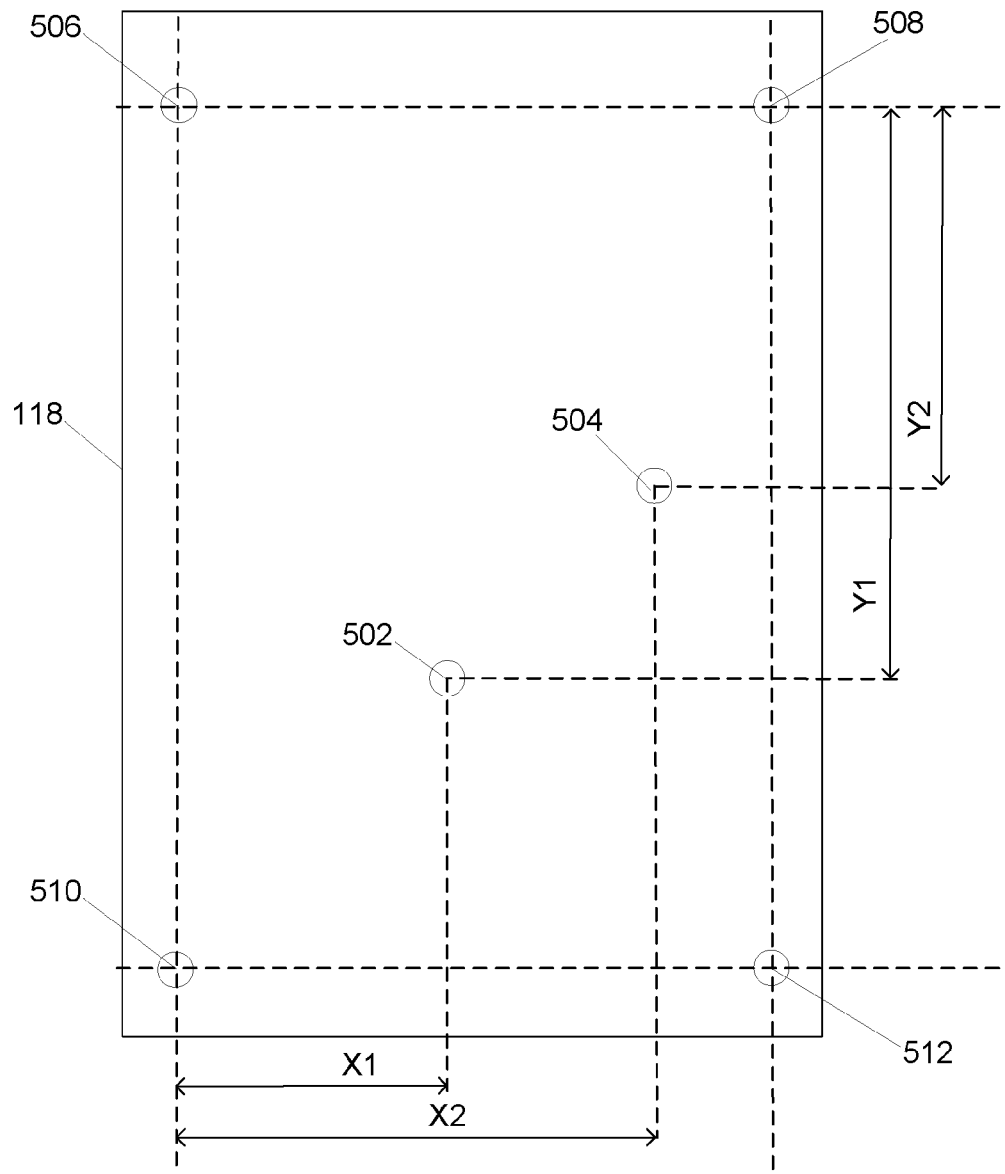
FIG. 5 illustrates an example of touches on a touch-sensitive display in accordance with the present disclosure.

An example of two touches on a touch-sensitive display is illustrated in FIG. 5 to describe one example of a method of determining the force at each of the two touches. The first touch 502 and second touch 504 are received and detected by the touch-sensitive display 118. The location of the first touch 502 and the location of the second touch 504 are determined. The force at each of the four force sensors 122, at the positions 506, 508, 510, 512, on the touch-sensitive display is also determined. The respective forces at each of the two touches 502, 504 may be determined, for example, by a best square fit. To determine the respective forces at each of the two touches 502, 504, the x component of the distance of the first touch 502 from the force sensor 122 at the position 506, referred to as X1 is determined. The y component of the distance of the first touch 502 from the force sensor 122 at the position 508, referred to as Y1 is determined. The x component of the distance of the second touch 504 from the force sensor 122 at the position 506, X2, is determined and the y component of the distance of the second touch 504 from the force sensor 122 at the position 508, Y2, is determined. The total distance between the force sensors 122 at the positions 506 and 508, which is the total X component difference, is known and the total distance between the force sensors 122 at the positions 506 and 510, which is the total Y component difference, is known.

A force distribution vector matrix is computed as $$DistMatrix = \begin{bmatrix} (SSX-X1)*(SSY-Y1) & (SSX-X2)*(SSY-Y2) \\ X1*(SSY-Y1) & X2*(SSY-Y2) \\ (SSX-X1)*Y1 & (SSX-X2)*Y2 \\ X1*Y1 & X2*Y2 \end{bmatrix} \Big/ (SSX*SSY)$$

where:
DistMatrix is the force distribution vector matrix;
SSX is the spacing between the force sensors 122 at the positions 506, 508; and
SSY is the spacing between the force sensors 122 at the positions 506, 510.
The values of X1, Y1, X2, Y2, SSX and SSY may be determined, in pixels, for example. Negative values of X1, Y1, X2 and Y2 may occur where a touch occurs near an edge of the touch-sensitive display 118, outside the rectangular area with corners located at the location of the force sensors 122.

A matrix inversion operation is performed on the force distribution vector matrix and the inverse matrix is multiplied by the forces determined at each of the force sensors to determine the force at each of the first and second touches 502, 504 as:

$$\begin{bmatrix} Forcetouch1 \\ Forcetouch2 \end{bmatrix} = Inverse(DistMatrix) * \begin{bmatrix} ForceF_1 \\ ForceF_2 \\ ForceF_3 \\ ForceF_4 \end{bmatrix},$$

where

Forcetouch1 is the applied force at the first touch 502;
Forcetouch2 is the applied force at the second touch 504;
Inverse (DistMatrix) is the inverse of the force distribution vector matrix;
$ForceF_1$ is the force determined at the force sensor 122, at the position 506;
$ForceF_2$ is the force determined at the force sensor 122, at the position 508;
$ForceF_3$ is the force determined at the force sensor 122, at the position 510; and
$ForceF_4$ is the force determined at the force sensor 122, at the position 512.

A value of the force applied at each of the touches may therefore be determined when more than one touch is detected.

A method includes detecting a touch on a first touch-sensitive display, applying force by an actuator on a touch-sensitive display to simulate depression of a switch, and storing a first indicator of depression simulation for the first touch.

A computer-readable medium has computer-readable code executable by at least one processor of a portable electronic device to perform the above method.

An electronic device includes a touch-sensitive display, an actuator operable to apply force on the touch-sensitive display, and a processor operably coupled to the actuator and the touch-sensitive display to detect a first touch on the touch-sensitive display, cause the actuator to apply force on a touch-sensitive display to simulate depression of a switch, and store a first indicator of depression simulation for the first touch.

Tactile feedback is provided for one or more touches on the touch-sensitive display. The use of the indicator facilitates tracking of the touch and the most recent tactile feedback for the touch. When the most recent tactile feedback for the touch is the simulation of the collapse of the dome switch, the indicator identifies the touch for determining which touches to track for modulating the charge to simulate release of the dome switch. When, for example, two touches are received that overlap in time, simulation of collapse of a dome switch may occur consecutively, one for each touch, before simulation of release for either touch. The indicator facilitates tracking to ensure that tactile feedback is provided for each touch. Tactile feedback facilitates a reduction in device use time for selection as confirmation is received when sufficient force is applied for the selection.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    detecting a first touch on a touch-sensitive display;
    when a first force applied by the first touch meets a first threshold, applying force by an actuator on the touch-sensitive display to simulate depression of a switch;
    storing a first indicator to indicate simulated depression of the switch for the first touch;
    when the first force applied by the first touch is less than or equal to a second threshold that is less than the first threshold, applying force by the actuator on the touch-sensitive display to simulate release of the switch;
    detecting a second touch on the touch-sensitive display, wherein the second touch overlaps at least partially in time with the first touch, applying force by the actuator on the touch-sensitive display, to simulate depression of the switch, and storing a second indicator to indicate simulated depression of the switch for the second touch.

2. The method according to claim 1, wherein storing an indicator comprises setting a flag associated with the first touch.

3. The method according to claim 1, wherein the first indicator is stored after determining that the first force applied by the first touch exceeds the first threshold.

4. The method according to claim 1, comprising changing the first indicator when the first force applied by the first touch is determined to be equal to or less than the second threshold.

5. The method according to claim 4, wherein changing the first indicator comprises clearing the first indicator.

6. The method according to claim 4, wherein changing the first indicator comprises clearing a flag associated with the first touch.

7. The method according to claim 1, comprising changing the first indicator when the first touch is no longer detected.

8. The method according to claim 1, wherein applying force by the actuator to simulate depression of the switch is repeated when a second force applied by the second touch exceeds the first threshold.

9. The method according to claim 8, comprising applying force, by the actuator on the touch-sensitive display, to simulate release of the switch when the force applied by the second touch is less than the second threshold.

10. The method according to claim 9, comprising changing the first indicator when the force applied by the first touch is equal to or less than the second threshold and changing the second indicator when the force applied by the second touch is less than or equal to the second threshold.

11. A non-transitory computer-readable storage medium having computer-readable code executable by at least one processor of a portable electronic device to perform the method according to claim 1.

12. An electronic device comprising:
    a touch-sensitive display;
    an actuator operable to apply force on the touch-sensitive display;
    memory; and
    a processor operably coupled to the memory, the actuator and the touch-sensitive display to detect a touch on the touch-sensitive display, when a first force applied by the first touch exceeds a first threshold, to cause the actuator to apply force on the touch-sensitive display to simulate depression of a switch, store a first indicator to indicate simulated depression of the switch for the first touch, when the first force applied by the first touch is equal to or less than a second threshold that is less than the first threshold, to cause the actuator to apply force on the touch-sensitive display to simulate release of the switch, detect a second touch on the touch-sensitive display, wherein the second touch overlaps at least partially in time with the first touch, cause the actuator to apply force on the touch-sensitive display to simulate depression of the switch, store a second indicator to indicate simulated depression of the switch for the second touch.

13. A method comprising:

detecting a first touch on a touch-sensitive display;

applying force by an actuator on the touch-sensitive display to simulate depression of a switch, and storing a first indicator to indicate simulated depression of the switch for the first touch;

applying force by the actuator on the touch-sensitive display to simulate release of the switch when a force applied by the first touch is less than a second threshold;

detecting a second touch on the touch-sensitive display, wherein the second overlaps at least partially in time with the first touch, applying force, by the actuator, on the touch-sensitive display to simulate depression of a switch and storing a second indicator, in addition to the first indicator, to indicate simulated depression of the switch for the second touch;

applying force by the actuator on the touch-sensitive display to simulate release of the switch when a force applied by the second touch is less than a second threshold.

14. The method according to claim 13, comprising changing the first indicator when the force applied by the first touch is less than the second threshold and changing the second indicator when the force applied by the second touch is less than the second threshold.

15. The method according to claim 13, wherein the first indicator and the second indicator are utilized to identify the first and second touches after simulation of depression of the switch and prior to simulation of release of the switch.

16. The method according to claim 13, wherein the first indicator is stored after determining that the force applied by the first touch meets a first threshold and the second indicator is stored after determining that the force applied by the second touch meets a second threshold.

17. The method according to claim 16, wherein the second threshold is less than the first threshold.

18. The method according to claim 13, wherein the first indicator is cleared after determining that the force applied by the first touch is less than or equal to the second threshold and the second indicator is cleared after determining that the force applied by the second touch is less than or equal to the second threshold.

19. A method comprising:

detecting a first touch on a touch-sensitive display;

when a first force applied by the first touch meets a first threshold, applying force by an actuator on the touch-sensitive display to provide first tactile feedback;

storing a first indicator to indicate the first tactile feedback for the first touch;

when the first force applied by the first touch is less than or equal to a second threshold that is less than the first threshold, applying force by the actuator on the touch-sensitive display to provide second tactile feedback;

detecting a second touch on the touch-sensitive display, wherein the second touch overlaps at least partially in time with the first touch, applying force by the actuator on the touch-sensitive display to provide third tactile feedback, and storing a second indicator to indicate the third tactile feedback for the second touch.

* * * * *